US011513996B2

(12) United States Patent
Bhutani et al.

(10) Patent No.: US 11,513,996 B2
(45) Date of Patent: Nov. 29, 2022

(54) NON-DISRUPTIVE AND EFFICIENT MIGRATION OF DATA ACROSS CLOUD PROVIDERS

(71) Applicant: EMC IP Holding Company LLC, Hopkinton, MA (US)

(72) Inventors: Neeraj Bhutani, Milpitas, CA (US); Ramprasad Chinthekindi, San Jose, CA (US); Nitin Madan, Cupertino, CA (US); Srikanth Srinivasan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/375,968

(22) Filed: Jul. 14, 2021

(65) Prior Publication Data

US 2021/0342294 A1    Nov. 4, 2021

Related U.S. Application Data

(63) Continuation of application No. 16/830,020, filed on Mar. 25, 2020, now Pat. No. 11,093,442.

(51) Int. Cl.
*G06F 16/00* (2019.01)
*G06F 16/11* (2019.01)
*G06F 16/901* (2019.01)
*G06F 16/23* (2019.01)
*G06F 11/30* (2006.01)
*G06F 11/14* (2006.01)

(52) U.S. Cl.
CPC ........ *G06F 16/119* (2019.01); *G06F 16/2365* (2019.01); *G06F 16/9014* (2019.01); *G06F 11/1407* (2013.01); *G06F 11/3075* (2013.01)

(58) Field of Classification Search
CPC .. G06F 16/119; G06F 16/2365; G06F 16/901; G06F 16/9014; G06F 11/1407; G06F 11/3075
See application file for complete search history.

(56) References Cited

U.S. PATENT DOCUMENTS

| | | | |
|---|---|---|---|
| 8,392,384 B1* | 3/2013 | Wu | G06F 16/1748 711/134 |
| 10,795,812 B1* | 10/2020 | Duggal | G06F 3/067 |
| 2010/0083283 A1* | 4/2010 | Kharat | G06F 9/4856 719/319 |
| 2018/0011852 A1* | 1/2018 | Bennett | G06F 16/2228 |
| 2020/0242095 A1* | 7/2020 | Malik | G06F 16/245 |

* cited by examiner

*Primary Examiner* — Diedra McQuitery
(74) *Attorney, Agent, or Firm* — Staniford Tomita LLP

(57) ABSTRACT

An index associates fingerprints of file segments to container numbers of containers within which the file segments are stored. At a start of migration, a boundary is created identifying a current container number. At least a subset of file segments at a source storage tier are packed into a new container to be written to a destination storage tier. A new container number is generated for the new container. The index is updated to associate fingerprints of the at least subset of file segments to the new container number. A request is received to read a file segment. The index is queried with a fingerprint of the file segment to determine whether the request should be directed to the source or destination storage tier based on a container number of a container within which the file segment is stored.

18 Claims, 12 Drawing Sheets

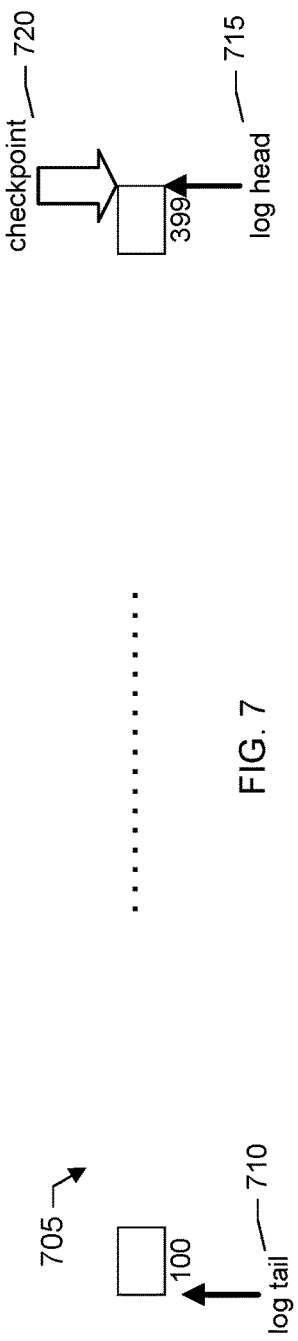
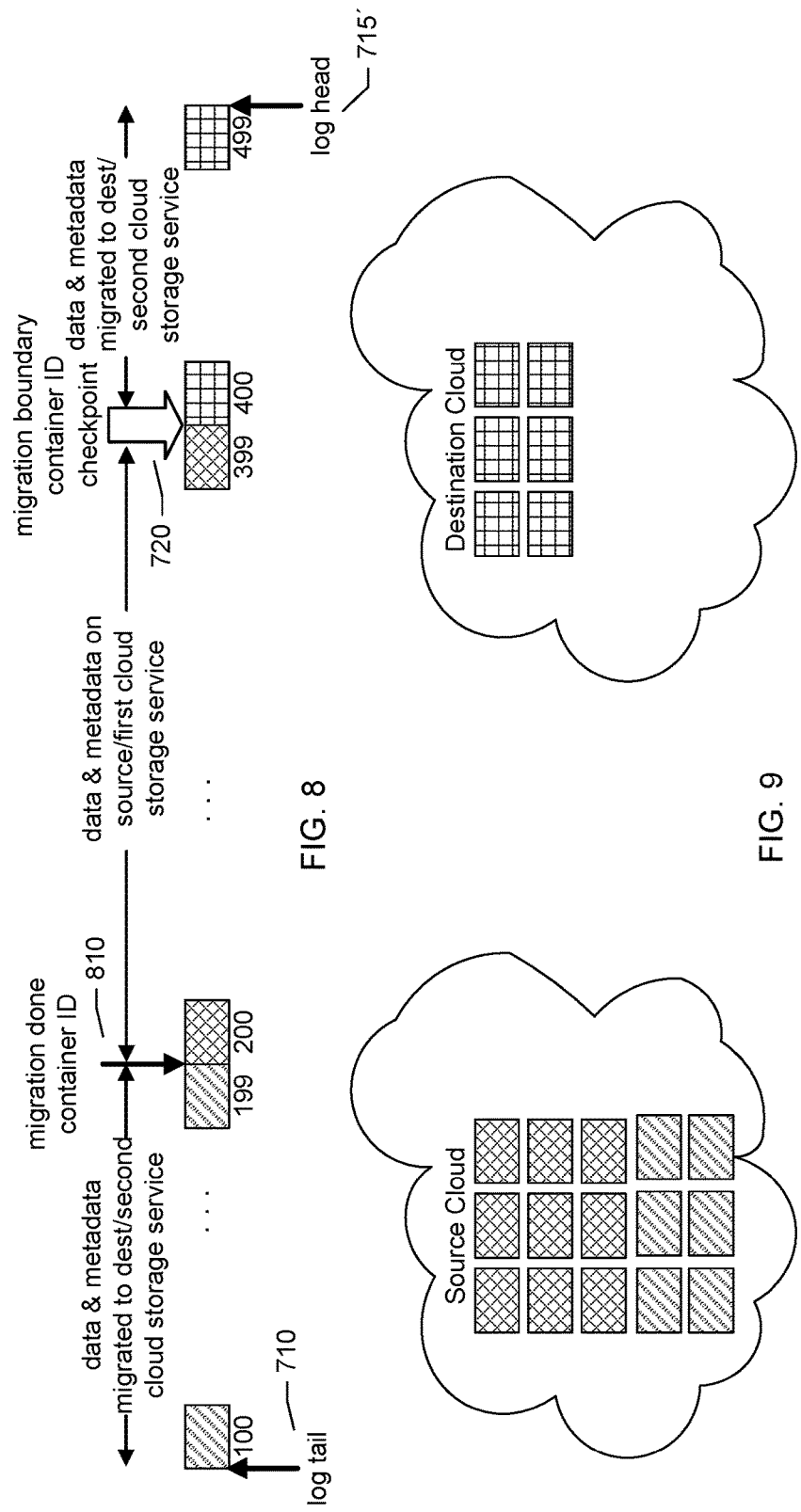
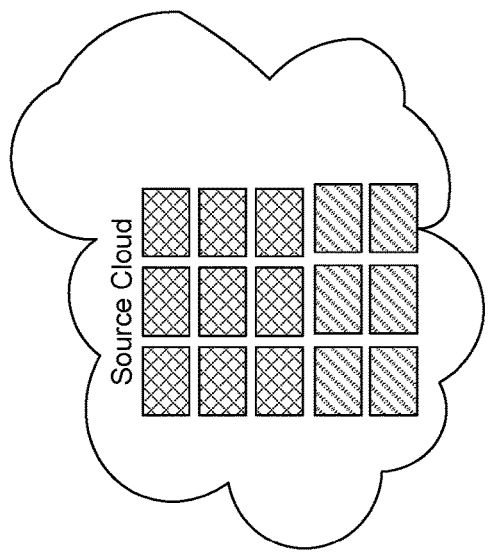
FIG. 7
FIG. 8
FIG. 9

NON-DISRUPTIVE AND EFFICIENT MIGRATION OF DATA ACROSS CLOUD PROVIDERS

CROSS-REFERENCE TO RELATED APPLICATIONS

This application is a continuation of U.S. patent application Ser. No. 16/830,020, filed Mar. 25, 2020, and is incorporated by reference for all purposes along with all other references cited in this application.

TECHNICAL FIELD

The present invention relates generally to information processing systems, and more particularly to efficiently migrating data from one cloud storage service to another cloud storage service without interrupting access to the data.

BACKGROUND

Many enterprises rely on cloud storage for storing data. Cloud storage is part of a cloud computing model where data is stored remotely by a cloud computing provider. The cloud computing provider offers data storage as a service. An enterprise can purchase cloud storage from the cloud provider. The enterprise's applications can then access the data stored on the cloud via storage protocols or application programming interfaces (APIs). The enterprise does not have to buy and maintain their own storage infrastructure because the infrastructure is owned and managed by the cloud computing provider.

In some cases, an enterprise may wish to migrate their data to a different cloud. For example, the enterprise may find that a different cloud storage service is better suited for the enterprise's needs. The other cloud storage service may offer lower pricing, increased security, faster performance, or other improved features.

Traditional approaches to migrate the data, however, are very disruptive, time consuming, and inefficient. Such approaches include taking the cloud service offline and using third party tools to transfer the data. With this approach, the enterprise's applications will not be able to access the data until the data transfer is complete.

Another approach is to recall the data from cloud storage back to the enterprise and transfer the recalled data to the new cloud storage. This approach can be extremely costly and time-consuming as the amount of data stored may be in the order of petabytes. An enterprise may not have the storage capacity or infrastructure to handle even temporary storage of the data.

Therefore, there is a need for improved systems and techniques for efficiently migrating data stored in a cloud to another cloud while continuing to allow access to the data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 7 shows a log of metadata containers in a first state, according to one or more embodiments.

FIG. 8 shows the log of metadata containers in a second state, after the first state, according to one or more embodiments.

FIG. 9 shows a block diagram of source and destination clouds during a migration, according to one or more embodiments.

DETAILED DESCRIPTION

Figure 1:
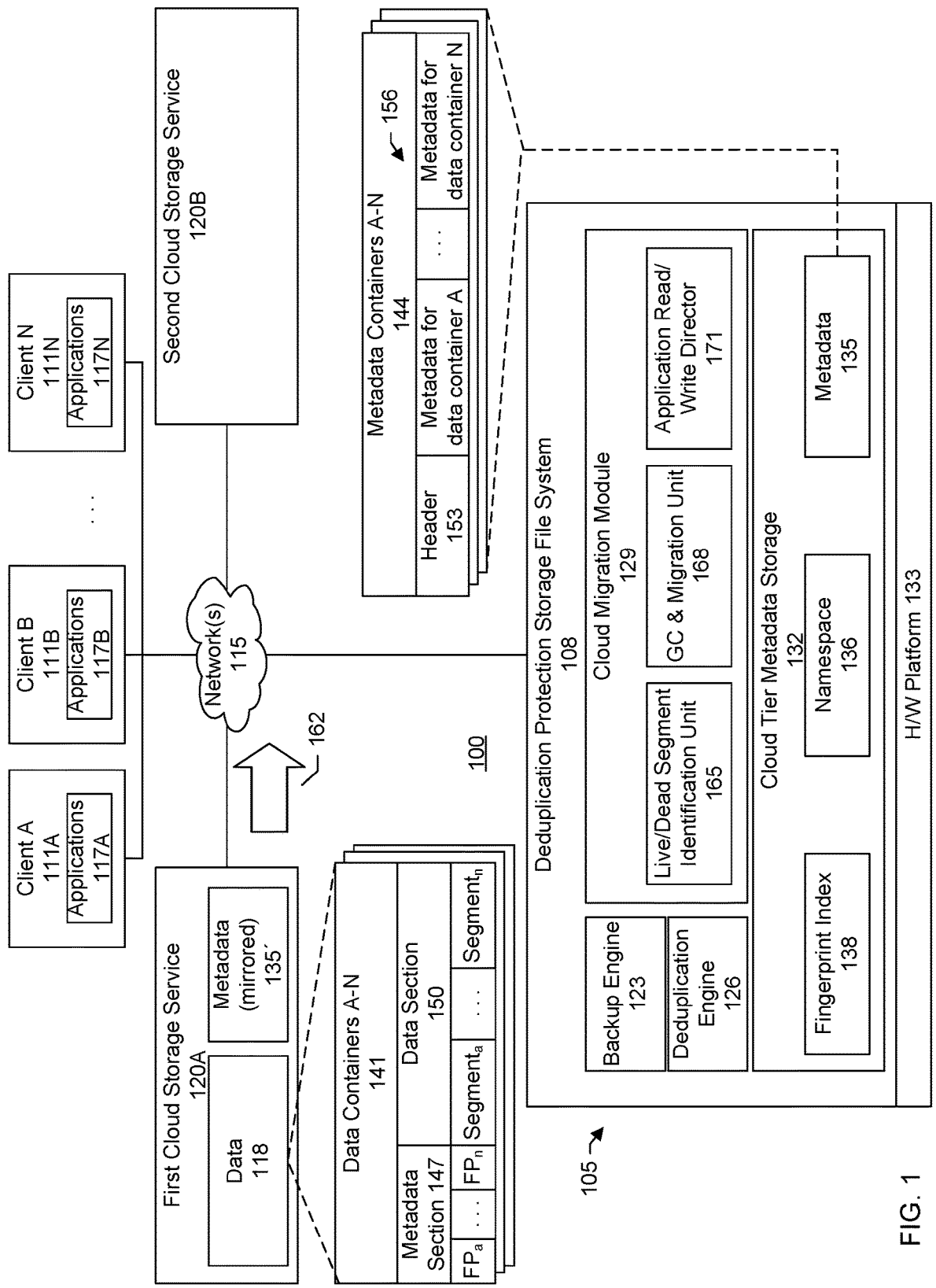
FIG. 1 shows a block diagram of an information processing system comprising a cloud migration module that efficiently migrates data across clouds, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for a cost and space optimized, non-disruptive, online, integrated cleaning and data migration across cloud providers. With the advent of cloud computing and cloud storage it is common for storage servers to support multiple storage tiers, with each tier having different latency, throughput, cost and durability guarantees.

Storage servers with local tiers are typically associated with lower latencies and higher bandwidth. As data ages, the older data or the infrequently accessed data may be migrated to the remote cloud storage tier for cost saving purposes. Storage servers should support a wide range of cloud providers and should be able to connect to multiple providers at any given point in time. Each cloud provider may offer a wide range of cloud storage services such as faster block storage, relatively slower object storage, slowest cold storage, and so forth, each varying in access latency, cost, and other attributes. In some cases, a user may wish to migrate data from one storage tier to another for various reasons such as:

1) Depending on the access patterns, the application performance requirements and the storage costs, the user may want to move data from one storage tier to another. For example, the user may wish to move the infrequently accessed data from faster and costly storage to a slower and cheaper storage like cold storage.

2) The user may need to migrate data from an existing cloud provider to a new cloud provider due to various reasons, such as the existing cloud provider shutting down operations and the users may have a limited time window to migrate all their data to another provider.

Some of the naive solutions of data migration from one storage service to another storage service or data migration across cloud providers include:

1) Taking the cloud tier storage offline and using some of the open-source tools to transfer data from one cloud provider to another provider.

2) Another solution is to recall all the cloud resident data from one provider or one storage service to a local tier and then migrate the data from the local tier to another cloud provider or another storage service.

Both these approaches have their limitations. In the first approach, the application cannot access data, until the data transfer completes. In the second approach, there is a cost of storing the recalled data temporarily in the local storage tier which could be in the order of petabytes.

FIG. 1 shows a block diagram of a computer network or information processing system 100 that provides for a new method and system of data migration from one storage tier to another storage tier within same cloud provider or across various cloud providers. The migration is online and non-disruptive to applications. The applications can continue to read and write data to a cloud tier, while the data is being migrated from an existing cloud tier to a new cloud storage tier in the background. In various specific embodiments, the system provides for: 1) online and non-disruptive data migration from one storage service to another storage service within a single cloud storage provider; 2) online and non-disruptive data migration from one storage service to another storage service across various cloud storage providers; 3) cost optimized data migration by avoiding data recall to on premise local storage; 4) space optimized data migration by migrating only live data from source tier to destination; 5) a method of integrated garbage collection and data migration; and 6) common metadata storage for source and destination storage services or tiers.

FIG. 1 shows a data storage system 105 having a deduplication file system 108. The deduplication file system is accessible by clients 111A-N over a network 115. The clients include applications 117A-N which access the data, e.g., files or objects, stored to the deduplication file system. First and second cloud storage service providers 120A, 120B, respectively, are likewise connected to the network and provide remote cloud storage for at least some of data 118 managed by the deduplication file system. The data may be stored in object storage provided by the cloud storage providers (e.g., AWS S3 bucket, or Azure blob).

In a specific embodiment, the deduplication file system includes a backup engine 123, a deduplication engine 126, a cloud migration module 129, and metadata storage 132. The deduplication file system is supported by an underlying hardware platform 133. The hardware may include storage, memory, processors, and the like. In particular, the storage may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks.

The backup engine is responsible for backing up data from the clients to the deduplication file system. The deduplication file system provides different types or tiers of storage. For example, recently backed up data may be placed in a first tier having high performance storage devices (e.g., solid state drives (SSDs)) as recently backed up data may be more likely to be accessed as compared to older backups. As backups age or frequency of access decreases, the backups may be transferred from the first tier to a second tier having lower performance, but less expensive storage devices (e.g., hard disk drives (HDDs)).

In a specific embodiment, the deduplication file system includes an active storage tier and a cloud storage tier. In this specific embodiment, initial backups from the clients are stored in the active tier which includes local storage. As these backups or secondary copies age, the backups may be moved from the local storage system to cloud storage such as the first cloud storage service. A cloud storage service is a type of cloud or remote storage that may be provided by a cloud provider. Examples of cloud storage providers include Amazon Web Services S3 (AWS) as provided by Amazon of Seattle, Wash.; Azure as provided by Microsoft Corporation of Redmond, Wash.; Dell EMC Elastic Cloud Storage S3 (ECS) as provided by Dell EMC of Hopkinton, Massachusetts; and others. Cloud storage can provide a cost-effective solution for long-term retention of at least a subset of the data in the deduplication file system. The deduplication file system may include a policy engine that moves and writes data from the active tier to cloud storage of the cloud tier once the data reaches a certain minimum age as specified in a policy.

As data including files, backup copies, or other objects are moved to cloud storage of the cloud tier, metadata 135 associated with the data is generated. The metadata includes pointers or references to objects, e.g., files or other units of data, that have been moved from the active tier to cloud storage. The metadata is stored in cloud tier metadata storage which is local to the data protection storage system. For example, the data protection system may be local to an enterprise customer of the data protection storage system. The data protection system may be installed within a data center owned by the enterprise.

The corresponding user data or data content, e.g., aged backup copies, reside remotely in a cloud storage service. The locally maintained metadata allows for efficiently tracking the location of the data residing in the cloud. In a specific embodiment, the metadata may be mirrored 135' to cloud storage for disaster recovery purposes. Namespace 136 provides an organizational structure for identifying and organizing the files stored in the deduplication file system including files that have been moved to cloud storage.

The deduplication engine is responsible for deduplicating data entering the deduplication file system. In a specific embodiment, the file system is a log-structured deduplication file system. In this specific embodiment, the log-structured deduplication file system divides the ingested stream of data into segments. The segment of data is hashed using a cryptographic hash for example Secure Hash Algorithm 1 (SHA-1). The output of the hashing algorithm is the fingerprint which uniquely describes that segment of data in the storage system.

An index 138 of all the fingerprints is maintained in the system and are fetched before any new data is written down. The index may be referred to as a fingerprint index. Newly arriving segments are filtered out against duplicates using the existing fingerprints in the index and then the new segments are packed into a container along with fingerprints and appended as a log. The index points to this container-identifier (e.g., container number) in the log. In a specific embodiment, the container number is a sequentially generated identifier. In a specific embodiment, the container number is a monotonically increasing number and these are never reused. All the containers in the metadata may be referred to as the container set.

In a specific embodiment, each cloud tier stores the user data in the cloud storage and maintains the metadata on the local storage that describes the data stored in the cloud provider. As discussed, the metadata in the local storage is also mirrored to the cloud storage to support cloud disaster recovery use cases.

More particularly, in a specific embodiment, there can be two types of containers including data containers 141 and metadata containers 144. A data container includes a metadata section 147 and a data section 150. The metadata section stores fingerprints. The data section stores segments corresponding to the fingerprints stored in the metadata section. The segments may be compressed into one or more compression regions of the container. In other words, each container includes a metadata section that describes the fingerprints and their location in the container, then regions of data. Thus, a container may have the format: "container: [[metadata section] [region#1] [region#2] . . . ]."

Each data container may be associated with a corresponding metadata container. The metadata container may include references, pointers, fingerprints, identifiers, or other information that can be used to locate a corresponding data container residing at a cloud storage service and data segments within the data container. In a specific embodiment, a metadata container includes metadata for multiple data containers.

A metadata container may be maintained on local storage and the corresponding data containers may be maintained on cloud storage. In a specific embodiment, a metadata container includes a header 153 and metadata sections 156 of multiple data containers. In a specific embodiment, the metadata container stores the metadata section of multiple data containers, e.g., two or more data containers. For example, a metadata container may include first metadata associated with a first data container, second metadata associated with a second data container, and so forth. A metadata container may be referred to as a CMETA container. In a specific embodiment, the metadata containers are stored on local storage so that the metadata sections can be read locally and without having to read from the cloud. Maintaining such containers on local storage provides good performance because reading from remote cloud storage can involve significant network latency and delay.

Figure 2:
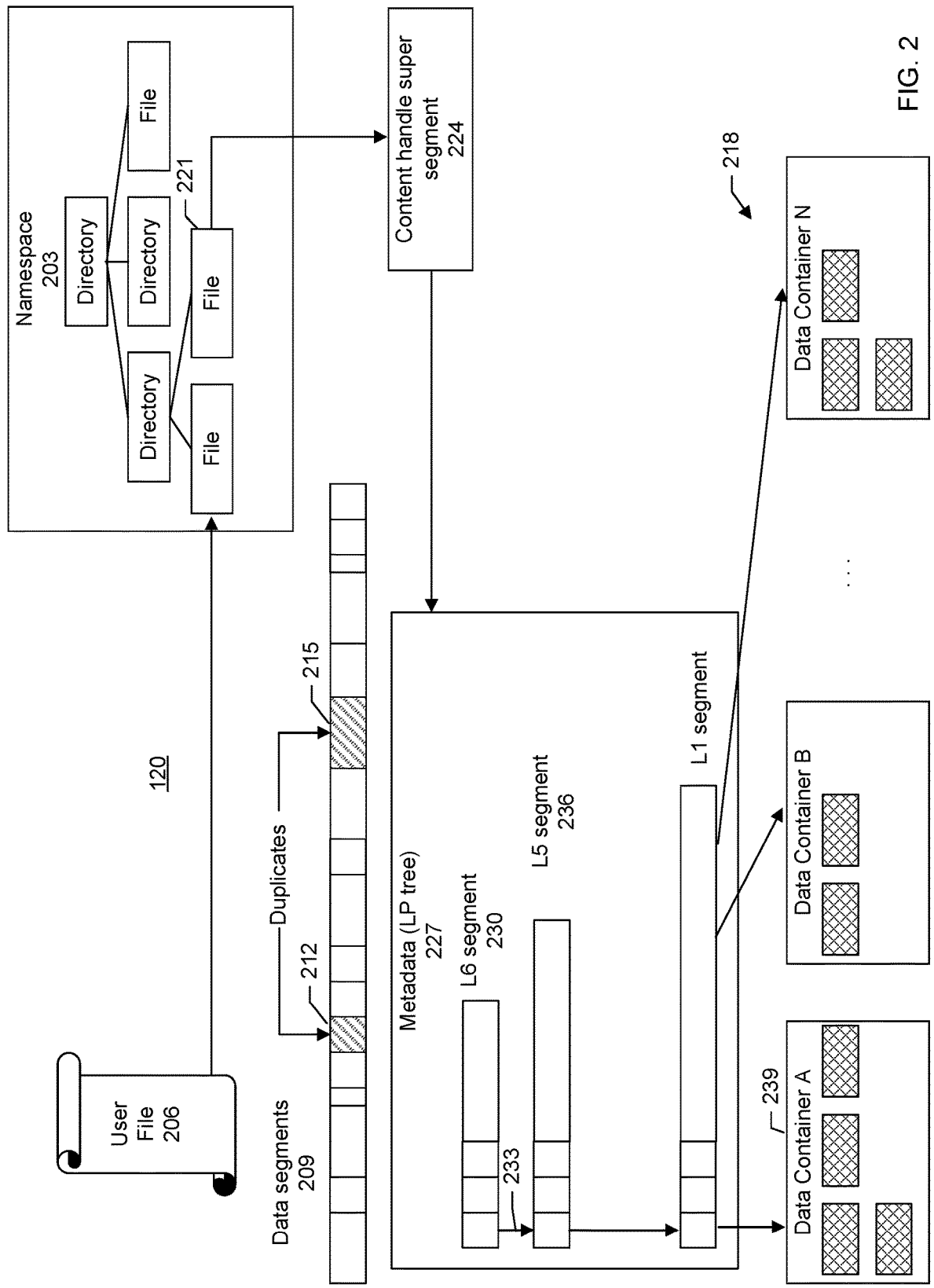
FIG. 2 shows an example of a duplication process, according to one or more embodiments.

FIG. 2 shows a block diagram illustrating a deduplication process of the deduplication file system shown in FIG. 1 according to one or more embodiments. As shown in the example of FIG. 2, the deduplication file system includes a namespace 203 providing an organizational structure for identifying and organizing the files stored in the file system. In an embodiment, there is a hierarchical organization in which files are organized into directories, subdirectories, and so forth.

As data, such as a user file 206, enters the deduplication file system, it is segmented into data segments 209 and filtered against existing segments to remove duplicates (e.g., duplicate segments 212, 215). A segment that happens to be the same as another segment that is already stored in the deduplication file system may not be again stored. This helps to eliminate redundant data and conserve storage space. Rather than again storing the redundant data segment, metadata is instead generated and stored to reference or point to the already existing segment. The metadata allows the deduplication file system to reconstruct or reassemble the file using the already or previously stored segment.

Any unique data segments are stored in fixed size immutable containers 218. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

In other words, in a specific embodiment, each file in the deduplication file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A segment tree may have any number of levels. The number of levels may depend on factors such as the expected size of files that are to be stored, desired deduplication ratio, available resources, overhead, and so forth. For example, having more levels may reduce the amount of redundant data stored, but may also increase the overhead required to manage the additional levels. Having fewer levels may decrease the overhead, but may also increase the amount of redundant data stored. In a specific embodiment, there are seven levels L6 to L0. L6 refers to the top level. L6 may be referred to as a root level. L0 refers to the lowest level. Thus, the upper segment levels (from L6 to L1 ) are the metadata segments and may be referred to as LPs. That is, the L6 to L1 segments include metadata of their respective child segments. The lowest level segments are the data segments and may be referred to as L0 s or leaf nodes.

More particularly, in a specific embodiment, every segment in the file system is identified by a 24 byte key (or the fingerprint of the segment), including the LP segments. Each LP segment contains references to lower level LP segments.

Figure 3:
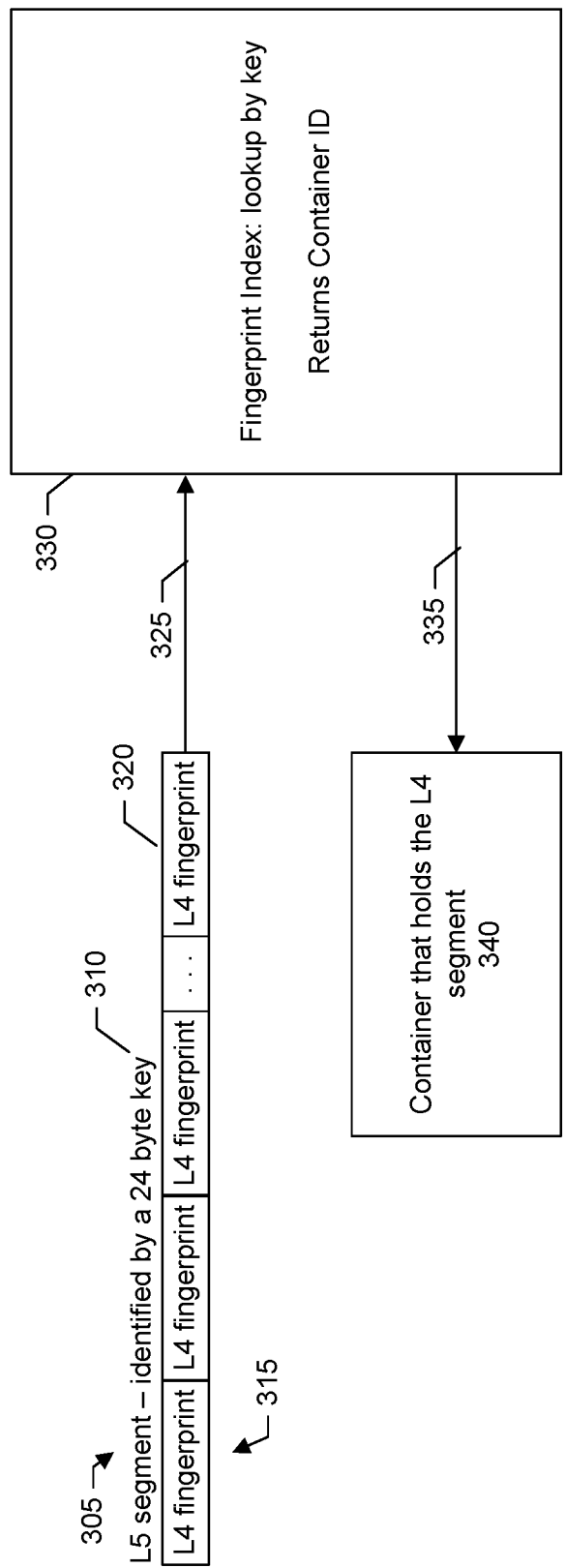
FIG. 3 shows an example of retrieving segments, according to one or more embodiments.

For example, FIG. 3 shows an L5 segment 305 identified by a fingerprint 310. The L5 segment contains L4 (or below) references 315, which is the key of that L4 segment.

For example, to locate an L4 segment 320, a corresponding L4 key is looked up 325 in an index or fingerprint index 330 of the deduplication file system to obtain and return 335 a container identifier (ID) 340 of a container that holds the content of the L4 segment. Thus, the index maps a fingerprint of a segment to a container in which the segment is stored. The index may include a listing of fingerprints of segments and a corresponding listing of container IDs of containers in which a respective segment is stored. An entry in the index may be formatted as "fp,cid" where "fp" refers to the fingerprint and "cid" refers to the container ID.

In other words, in a specific embodiment, a segment tree may represent metadata for a file where the L0 segments are the data portions. When a file is received by the deduplication file system, the file is broken or divided into small segments. The segments may be placed into containers and written (e.g., written to disk or other persistent storage). An index maintains a mapping between fingerprints of the segments and the containers in which the segments are stored. The index helps to facilitate deduplication. In particular, if a segment of a file has been written, a fingerprint of the segment is maintained in the index. Thus, a fingerprint of a new segment can be compared to the index. If there is a matching fingerprint, the new segment may not be written, the new segment having been determined to be a duplicate.

Referring back now to FIG. 1, as discussed, a user may wish to migrate 162 their data from a first cloud storage service to a second cloud storage service, different from the first cloud storage service. The first cloud storage service may be referred to as a source cloud. The second cloud storage service may be referred to as a destination cloud. Migration will be complete when all the data and the metadata is migrated from the source cloud storage to the destination cloud storage. The migration process is able to migrate all the metadata and data from the source to destination without any impact on application reads or writes to data.

In a specific embodiment, the cloud storage services may be offerings from different cloud providers. For example, the first cloud storage service may be provided by a first cloud provider (e.g., Amazon AWS). The second cloud storage service may be provided by a second cloud provider (e.g., Microsoft Azure), different from the first cloud provider. Thus, the cloud infrastructure for the first cloud may be owned and operated by the first cloud provider. The cloud infrastructure for the second cloud may be owned and operated by the second cloud provider, different from the first cloud provider. In another specific embodiment, the first and second cloud storage services may be different storage services offered by the same cloud provider.

In a specific embodiment, the cloud migration module includes a live/dead segment identification unit 165, a garbage collection (GC)/migration unit 168, and an application read/write director 171. It should be appreciated that the components and modules shown in FIG. 1 may be functional and there can be many different hardware and software configurations.

The live/dead segment identification unit is responsible for determining whether a segment residing at the first cloud storage service is a live segment or a dead segment. A segment may be considered a dead segment if it is not referenced by any live segments. A segment may be considered a live segment if it is referred by at least one other live segment. Segments identified as live are migrated. Segments identified as dead are not migrated. Migrating live segments, but not dead segments, helps to provide an efficient transfer of data including conserving network bandwidth and storage, and the lowering of costs that may be charged by a cloud storage service.

The GC/migration unit is responsible for copying live segments from the first cloud storage service, e.g., source cloud, to the second cloud storage service, e.g., destination cloud, and then deleting or cleaning the segments from the source cloud to reclaim storage space.

The application read/write director is responsible for redirecting I/O reads and writes from the applications to the appropriate cloud storage service during or while the migration is in progress.

Migrating data from the source to destination cloud can require a significant amount of time to complete depending upon factors such as the amount of data to transfer, network availability, and other computer resources. There may be a need to write or access the data before the migration is complete. For example, while the migration is underway, the file system may receive a write request. The application read/write director is responsible for directing the write request to the destination cloud.

As another example, example, while the migration is underway, the file system may receive a read request. In some cases, data responsive to the read request may still be residing at the source cloud. In this case, the application read/write director directs the read request to the source cloud. In other cases, the data responsive to the read request may have already been migrated to the destination cloud. In this case, the application read/write director directs the read request to the destination cloud.

Figure 4:
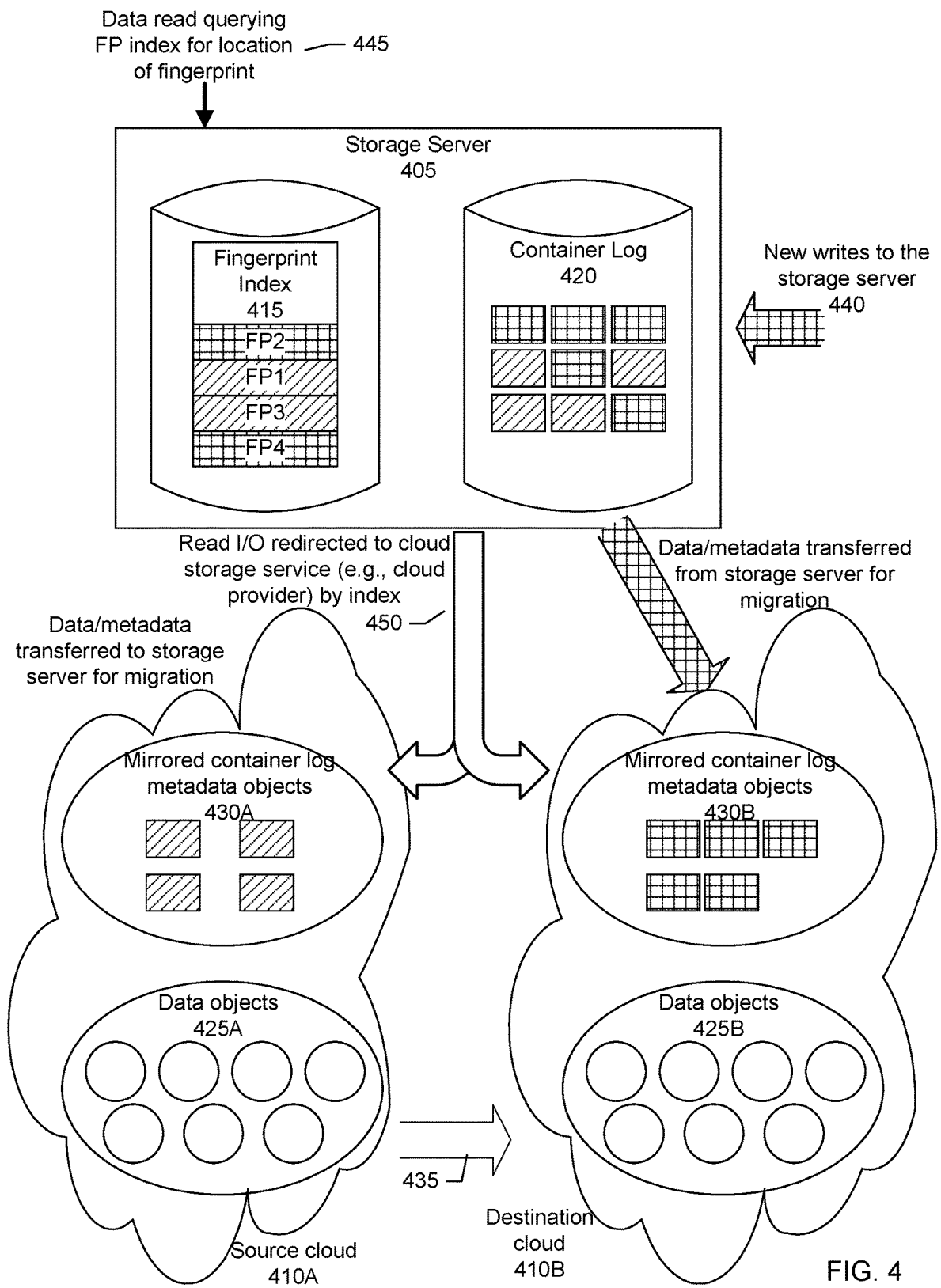
FIG. 4 shows an architecture of a storage server and source and destination clouds, according to one or more embodiments.

FIG. 4 shows an architecture of a tiered storage system and migrating from source to destination clouds. There is a storage server 405, a source cloud 410A, and a destination cloud 410B. A fingerprint index 415 and container log 420 is maintained at the storage server. The fingerprint index provides a mapping of fingerprints to container IDs of containers storing segments corresponding to the fingerprints or references. In the example shown in FIG. 4, the fingerprint index shows fingerprints FP2, FP1, FP3, and FP4; and the container log shows nine boxes representing nine containers. The source cloud includes data objects 425A and mirrored container log metadata objects 430A. The destination cloud includes data objects 425B and mirrored container log metadata objects 430B.

Fill patterns are shown with the shapes in FIG. 4 show a state of the system during or while a migration 435 is in progress. In particular, a fill pattern of upward sloping diagonal lines shown in container log metadata objects at the source cloud indicates these objects having been deleted because they have been migrated from the source to destination cloud and corresponding fingerprint references updated in the fingerprint index. A fill pattern of grid lines shown in container log metadata objects at the destination cloud indicates these objects as currently residing at the destination cloud where the fingerprint references in the fingerprint index have been updated to reference or point to their new locations in the destination cloud.

New writes 440 to the storage server, as shown by arrows with grid fill patterns, are directed to the destination cloud.

Read requests occurring during the migration result in querying 445 the fingerprint index to determine whether the read should be serviced by the source cloud or the destination cloud. In other words, the read I/O is redirected 450 to one of the source cloud or the destination cloud by the index.

Figure 5:
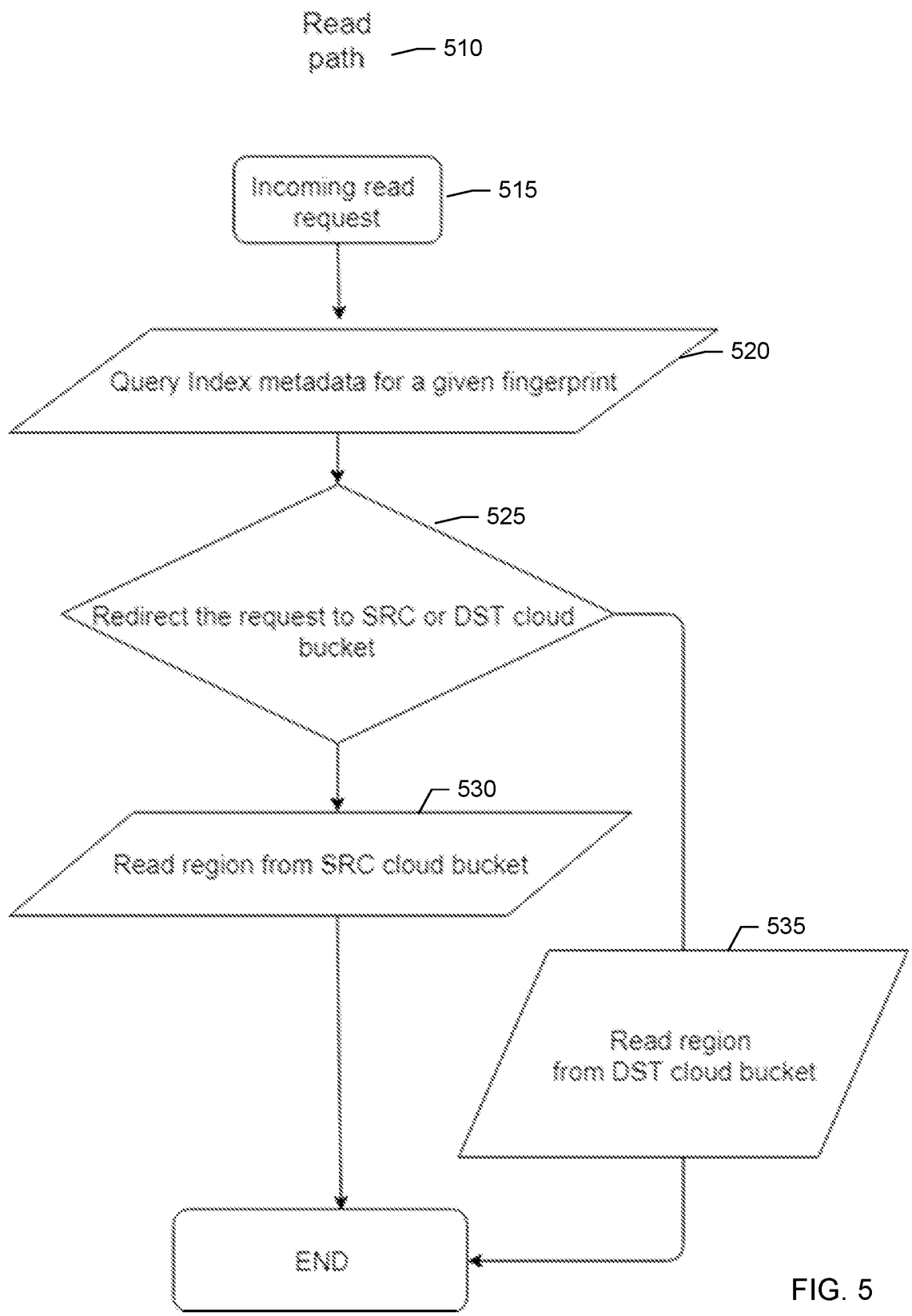
FIG. 5 shows a flow of a read path, according to one or more embodiments.

FIG. 5 shows a flow of a read path 510. In a step 515, there is an incoming read request. In a step 520, the index is queried for metadata for a given fingerprint associated with the read request. In a step 525, based on the fingerprint to container ID mapping in the index, a determination is made as to whether to redirect the read request to the source (SRC) or destination (DST) cloud bucket. If the read request is directed to the source cloud bucket, a region is read from the source cloud bucket (step 530). If the read request is directed to the destination cloud bucket, a region is read from the destination cloud bucket (step 535).

More particularly, in a specific embodiment, there is an online and integrated garbage collection and data migration algorithm. In this specific embodiment, GC uses a mark and sweep algorithm to clean dead space. In the mark phase, GC identifies all the live references or live fingerprints in the system using namespace and container enumeration. In the sweep phase, GC copies forward the live data and deletes the old block to free dead space. GC uses Perfect Hash Vector (PHV) bit vector to compactly represent the liveness information of every fingerprint in the system and it maps every fingerprint to a unique position in the PHV bit vector and avoids collision.

The migration may be divided into several phases including an analysis phase, enumeration phase, and migration phase.

Table A below shows an overview of processes during the analysis phase.

TABLE A

| Step | Description |
|---|---|
| 1 | Flush the inflight fingerprints to the on-disk fingerprint index table. The file system index contains all the mappings from a segment reference (also known as fingerprint key) to the container number. |
| 2 | Iterate all the entries in the index, build Perfect Hash Functions (PHF), which map every segment fingerprint in the system to a unique bit position in the Perfect Hash Vector (PHV). |

Table B below shows an overview of processes during the enumeration phase.

TABLE B

| Step | Description |
|---|---|
| 1 | Enumerate the cloud tier namespace, which gives the top level fingerprint references of the segment trees of the user files resident in the cloud tier also known as L6 fingerprints. |
| 2 | Walk the metadata containers level by level starting from L6 segment to L1 segment and populate PHV with all the live fingerprints from L6 to L0 in the PHV. |

Table C below shows an overview of processes during the migration phase.

TABLE C

| Step | Description |
|---|---|
| 1 | Walk the metadata containers, iterate all the fingerprints in the metadata containers and identify the live and dead fingerprints of each container by referring to the PHV created in Step 2 (Enumeration phase) |
| 2 | Pack the live segment data into a new in-memory data container and write the data container to the destination cloud tier/provider. |
| 3 | Generate the new metadata container having references to the new data container and write it locally and replicate it to the destination cloud storage tier. |
| 4 | Update the index with fingerprints mapping to new containers. |
| 5 | Delete the source data containers from the source cloud tier/provider and also delete the source metadata containers. This also deletes the source container fingerprint entries from index. |

Figure 6:
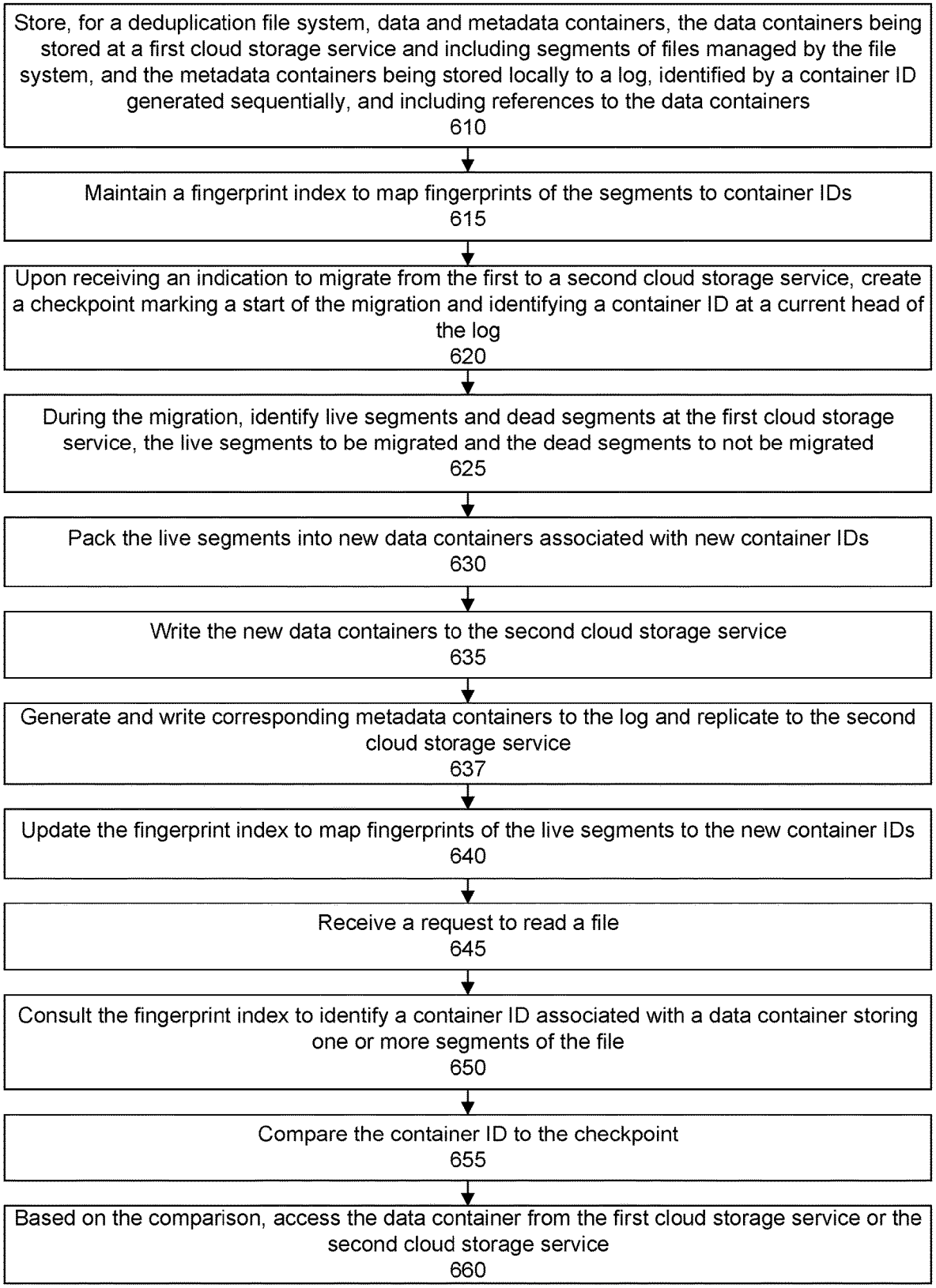
FIG. 6 shows an overall flow for efficiently migrating data across clouds, according to one or more embodiments.

FIG. 6 shows a flow diagram for migrating. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, a deduplication file system stores containers including data and metadata containers. The data containers are stored at a first cloud storage service and include user data including segments of files managed by the deduplication file system. The metadata containers are associated with the data containers and are stored locally to a log. A log is a type of data structure in which new writes are made to a head of the log. Once the log is full, it may be written into an unused part of the disk in a sequential manner. That is, writes are performed sequentially. In a specific embodiment, a technique of the system leverages properties or attributes of a log-structured file system to allow application IO (e.g., reads and writes) or access to continue throughout a migration by determining whether an IO should be directed to the first cloud or the second cloud.

In an embodiment, the metadata containers are further mirrored or replicated to the first cloud storage service. The metadata containers include references to the data containers and are identified by container IDs. The container IDs are generated sequentially, i.e., according to a logical order or sequence. In a specific embodiment, a new container ID is generated by incrementing a last container ID. In another specific embodiment, a new container ID is generated by decrementing a last container ID. It should be appreciated that an algorithm to generate container IDs may include any mathematical computation so long as it generates an ordered or sequential listing of identifiers.

In a step 615, a fingerprint index is maintained to map fingerprints of the segments to container IDs.

In a step 620, upon receiving an indication to migrate from the first cloud storage service to a second cloud storage service, a checkpoint is created marking a start of the migration. The checkpoint identifies a container ID corresponding to a current head of the log which, in turn, represents a last, current, or most recent metadata container storing pointers or references to data objects (e.g., corresponding data container) residing at the first cloud storage service.

FIG. 7 shows a first state of a log of metadata containers 705 storing pointers to data objects residing at the source cloud. As discussed, in a specific embodiment, the deduplication file system is a log-structured file system in which data and metadata are written sequentially to a log. As shown in the example of FIG. 7, the log includes a log tail 710 indicating a beginning of the log and a log head 715 indicating a current head of the log.

The containers storing the metadata are numbered sequentially from 100 to 399. A checkpoint 720 has been created (step 620—FIG. 6) marking a start or boundary of the migration and identifying a container ID (e.g., container 399) of the last container which corresponds to a current head of the log.

Referring back now to FIG. 6, in a step 625, during the migration live segments and dead segments at the first cloud storage service are identified. The live segments are to be migrated and the dead segments are not to be migrated.

In a step 630, the live segments are packed into new data containers associated with new container IDs and the new data containers are written to the second cloud storage service (step 635).

In a step 637, new metadata containers associated with the new data containers are generated. The new metadata containers include references to the new data containers. The new metadata containers are stored locally and written to the log. The new metadata containers may additionally be replicated to the second cloud storage service.

In other words, during or while the migration is in progress, the container log may include first and second subsets of numbered metadata containers. The first subset of numbered metadata containers may include references to data residing at the first cloud storage service which has not yet been migrated to the second cloud storage service. The second subset of numbered metadata containers may include references to data residing at the second cloud storage service. The data residing at the second cloud storage service may include data migrated from the first cloud storage service, new data received by the file system after the checkpoint, or both. In a specific embodiment, the container identification or numbering algorithm is consistent across the first and second cloud storage services or global with respect to the first and second cloud storage services. This allows a container ID to be uniquely identified across the first and second cloud storage services, along with its sequential ordering or position in the log.

In other words, in a specific embodiment, during the migration, a new data container may be written to the second cloud storage service. The new data container may include live segments from the first cloud storage service and not include dead segments from the first cloud storage. The dead segments may be omitted or excluded from the migration. A new metadata container may be created, referencing the new data container at the second cloud storage service, and having a new container ID generated sequentially with respect to a container ID at a current head of the log. The new metadata container may be written to the log, the new metadata container now being at the current head of the log. The log may include metadata containers referencing data containers at the first cloud storage service, and metadata containers referencing data containers at the second cloud storage service.

FIG. 8 shows a second state, after the first state, of the log of metadata containers. In the example shown in FIG. 8, containers 100 to 199 are shown with a fill pattern of diagonal lines slopping upwards to indicate that the data and metadata corresponding to these containers has been migrated to the second cloud storage service (e.g., destination or new cloud provider) and have been deleted from the first cloud storage service. An arrow 810 indicates a current progress of the migration and identifying a last container to have been migrated, e.g., container 199 (or next container to be migrated, e.g., container 200).

The log includes new containers 400 to 499 shown with a fill pattern of grid lines to indicate that they represent data and metadata that have been migrated to the second cloud storage service. Thus, in an embodiment, a container ID is a unique increasing number across the first and second cloud storage services. Log head 715 has shifted to identify container 499 as currently sitting at a head of the log. New containers 400 to 499 may include one or more of live data migrated from the first cloud storage service (source) to the second cloud storage service (destination) or data associated with new writes received during the migration. The amount of data migrated from the first cloud storage to the second cloud storage service may be less than the actual amount of data residing at the first cloud storage because data at the second cloud storage service determined to be dead, e.g., dead segments, is not migrated.

Containers 200 to 399 in the log are shown with a diamond fill pattern to indicate that the data and metadata corresponding to these containers are still on the first cloud storage service (e.g., source or old cloud provider) and have not yet been migrated.

FIG. 9 shows a block diagram representation of the second log state shown in FIG. 8. In other words, in the example shown in FIG. 8, the garbage collector (GC) picked or selected data containers 100-199 from the source cloud tier and copy forwarded the live data from these containers to new data containers 400-499 onto the destination cloud tier. Before the start of migration, all the containers existed on source cloud tier from range 100-399 (FIG. 7). The fill pattern of upward sloping diagonal lines shows that GC already cleaned containers in the range 100-199 (upward sloping diagonal lines) from the source tier and copied the live data to new containers 400-499 (grid fill pattern) on the destination tier. The migration phase is yet to work on the container range 200-399 (diamond fill pattern) from the source tier. In a specific embodiment, the GC selects containers starting with the earliest container and progressing towards later containers.

Referring back now to FIG. 6, in a step 640, the fingerprint index is updated to map fingerprints of the live and now migrated segments to the new container IDs. In a step 645, a request is received to read a file. In a step 650, the fingerprint index is consulted or examined to identify a container ID associated with a data container storing one or more segments of the file. In a step 655, the container ID is compared to the checkpoint. In a step 660, based on the comparison, the data container having the relevant segments is accessed from the first cloud storage service (e.g., source cloud if container has yet to be migrated) or second cloud storage service (e.g., destination cloud if the container has already been migrated).

More particularly, in a specific embodiment, the file system includes techniques for synchronization and interaction between GC/migration versus application read/write. Table D below shows an example of the flow.

TABLE D

| Step | Description |
|---|---|
| 1 | GC/Migration process picks up a batch of containers (calling them as source containers) for copy forward at a time. |
| 2 | GC sets deduplication mask on these source containers, to prevent application data deduplication from these containers, which are about to be cleaned and deleted. |
| 3 | GC copy forwards live data to destination tier and generates corresponding metadata. |
| 4 | GC sets read mask on these source containers. For all subsequent reads for the same data, index returns the new destination containers. Thus reads will be redirected to the destination tier. |

An algorithm is provided to handle application reads during the migration process. All read requests may be split into two types. Read requests coming for data residing on the source storage tier versus read requests coming for data residing on the destination storage tier. Table E below shows a flow for handling application reads.

TABLE E

| Step | Description |
|---|---|
| 1 | For the read request, a lookup is performed of the index to obtain the corresponding container number. If the fingerprint index points to a container number greater than the boundary container number, then the read will be serviced from the destination storage tier. |
| 2 | If the container number is below the boundary container number, the read will be served from the source storage tier. |

An algorithm is likewise provided to handle application writes during the migration. To handle application writes, all newly ingested data is segmented, fingerprinted and deduplicated using the existing fingerprints in the index of the system. If the segments are already in the system the data will not be written down. Instead, an indirect reference to this data may be written to disk.

Figure 10:
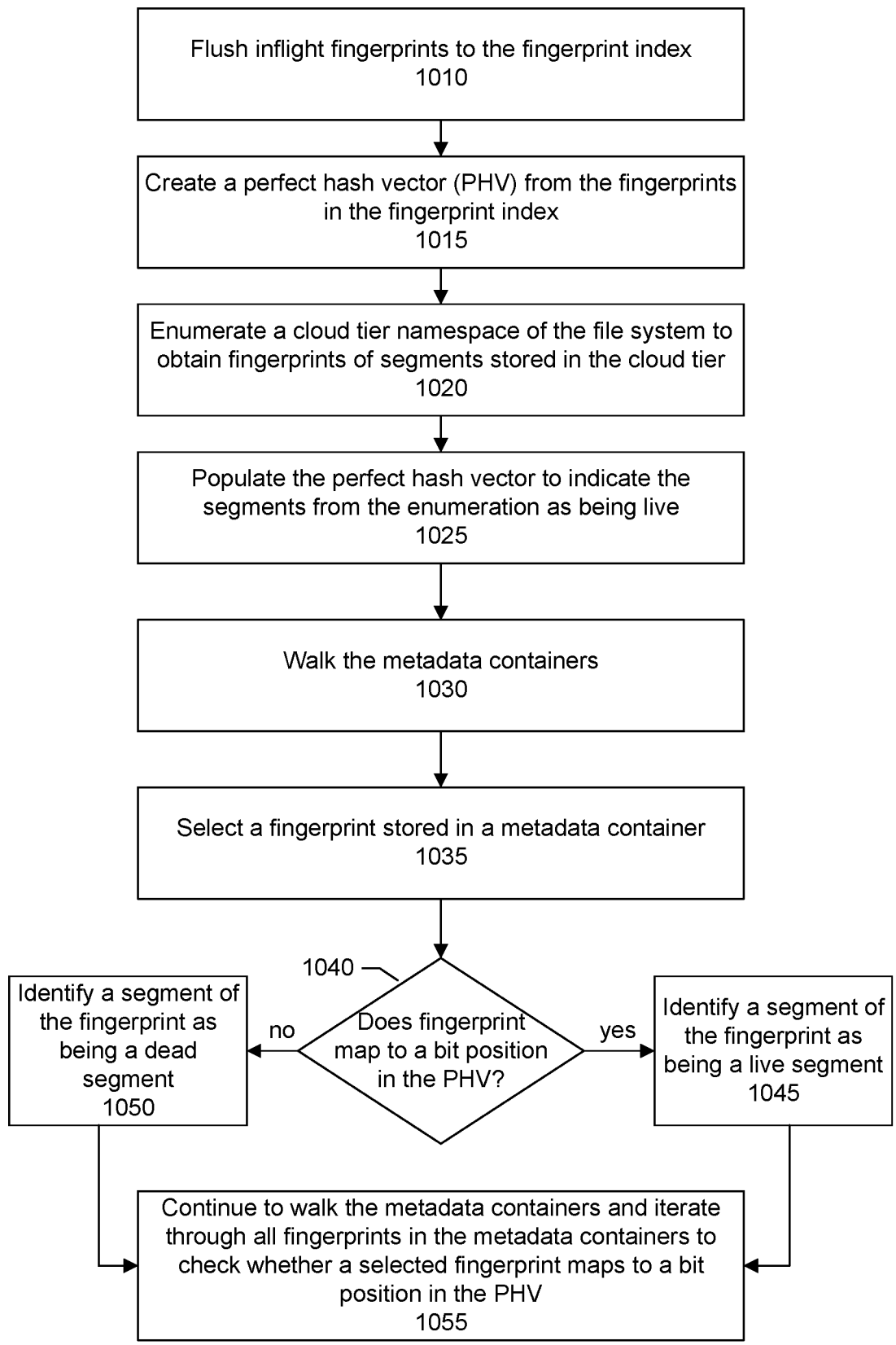
FIG. 10 shows a flow for identifying live segments that should be migrated, and dead segments that should not be migrated, according to one or more embodiments.

FIG. 10 shows detail of a flow for identifying live segments and dead segments (step 625, FIG. 6). In a step 1010, inflight fingerprints are flushed to the fingerprint index. In other words, outstanding I/O activities are flushed so that all metadata and segments can be persisted and the fingerprint index brought to a consistent state. The fingerprints in the index represent segments that are live.

In a step 1015, a perfect hash vector (PHV) is created from the fingerprints in the fingerprint index using a perfect hash function (PHF). The perfect hash vector may be referred to as a live vector. A PHF is a collision free hash function that maps a key set of size "n" to a range of size "m", where m>n. To avoid collisions, PHF needs to be pre-computed taking the key set as input. That means that the input key set needs to be known beforehand.

Figure 11:
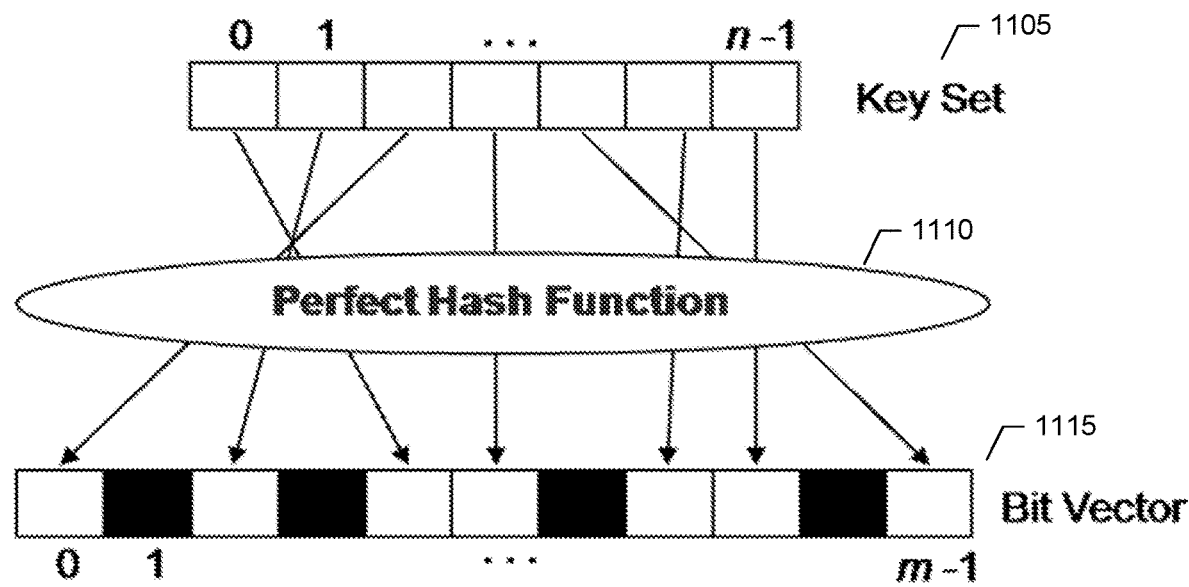
FIG. 11 shows a block diagram illustrating creating a perfect hash vector, according to one or more embodiments.

FIG. 11 illustrates how this data structure is used to map "n" keys to "m" positions in a bit vector, without collision using the PHFs built. The PHF functions are built by computing different hash functions until a collision free mapping for the given set of keys is obtained. The bit vector data structure is referred to as Perfect Hash Vector (PHV).

As shown in the example of FIG. 11, there is a key set 1105. The key set represents fingerprints from the fingerprint index. A perfect hash function 1110 is applied to the key set, e.g., fingerprints from the index, to generate a bit vector or perfect hash vector 1115. A benefit of the perfect hash vector is its relatively small and compact size. For example, the fingerprints or keys are not stored in the perfect hash vector. Fingerprints are not saved in the bit positions of the perfect hash vector. Thus, the perfect hash vector has a much smaller and more compact size as compared to a conventional hash table in which the keys are stored in the table.

Referring back now to FIG. 10, in a step 1020, a cloud tier namespace of the deduplication file system is enumerated to obtain fingerprints resident in the cloud tier. The enumeration provides top level fingerprint references of the segment trees of the user files resident in the cloud tier which may also be referred to as L6 fingerprints.

Figure 12:
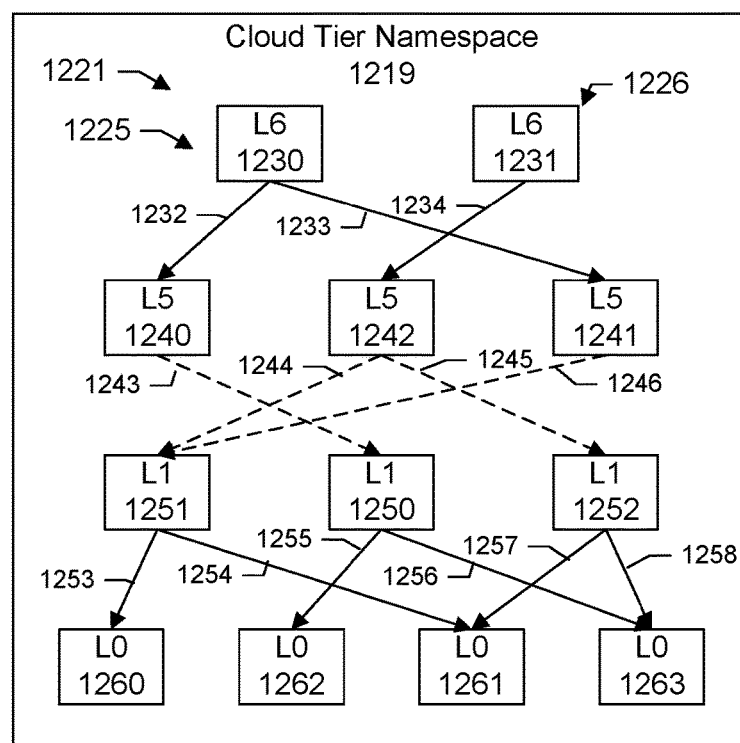
FIG. 12 shows an example of a namespace, according to one or more embodiments.

FIG. 12 shows an example of a cloud tier namespace 1219 that may be enumerated. The namespace includes a set of segment trees 1221. Each file in the deduplication file system is represented by a segment tree. In a specific embodiment, the segment tree is a Merkle tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references.

The example shown in FIG. 12 shows segment levels L6, L5, L1, and L0. Segment levels L4, L3, and L2 have been omitted for purposes of clarity. An L6 segment forms a root or parent. Thus, in the example shown in FIG. 12, there is a first segment tree 1225 having an L6 segment 1230 and representing a first file. There is a second segment tree 1226 having an L6 segment 1231 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 12, L6 segment 1230 references L5 segments 1240, 1241 as shown by arrows 1232, 1233 from L6 1230 to L5 1240, 1241, respectively. L6 segment 1231 references L5 segment 1242 as shown by an arrow 1234 from L6 1231 to L5 1242. L5 segment 1240 references an L1 segment 1250 as shown by an arrow 1243 from L5 1240 to L1 1250. L5 segment 1242 references L1 segments 1251, 1252 as shown by arrows 1244, 1245 from L5 1242 to L1 1251, 1252, respectively. L5 segment 1241 references L1 segment 1251 as shown by an arrow 1246 from L5 1241 to L1 1251. The arrows from the L5 to L1 segment level are shown in broken lines to indicate that there can be other intermediate levels between the L5 and L1 levels.

L1 segment 1251 references L0 segments 1260, 1261 as shown by arrows 1253, 1254 from L1 1251 to L0 1260, 1261, respectively. L1 segment 1250 references L0 segments 1262, 1263 as shown by arrows 1255, 1256 from L1 1250 to L0 1262, 1263, respectively. L1 segment 1252 references L0 segments 1261, 1263 as shown by arrow 1257, 1258 from L1 1252 to L0 1261, 1263, respectively.

In a specific embodiment, an upper level segment includes a fingerprint of fingerprints of one or more lower level segments referenced by the upper level segment. For example, L6 segment 1230 includes a finger of fingerprints of L5 segments 1240, 1241. L6 segment 1232 includes a fingerprint of fingerprint of L5 segment 1242. L5 segment 1240 includes a fingerprint of fingerprint of L1 segment 1250. L5 segment 1242 includes a fingerprint of fingerprints of L1 segments 1251, 1252. And so forth.

Referring back now to FIG. 10, in a step 1025, the perfect hash vector is populated with all the live fingerprints from L6 to L0 by walking the metadata containers level-by-level starting from the uppermost segment level (e.g., L6 segment level) to the last upper segment level (e.g., L1 segment level). In other words, upper segment levels of the segment trees are traversed, level-by-level, to identify fingerprints of each level of the segment trees. This traversal may be referred to as breadth-first where all segments in a particular level may be traversed before advancing to a next level. The breadth-first approach allows for traversing a segment a single time even though the segment may be referred by multiple files.

In a specific embodiment, the fingerprints from the level-by-level traversal are hashed using the perfect hash function and bits are set in the perfect hash vector corresponding to the hashed fingerprints. The traversal of the levels to identify and hash the fingerprints and set the perfect hash vector continues for each of the upper segment levels. Further discussion is provided in U.S. patent application Ser. No. 16/034,282, filed Jul. 12, 2018, which is incorporated by reference along with all other references cited.

Figure 13:
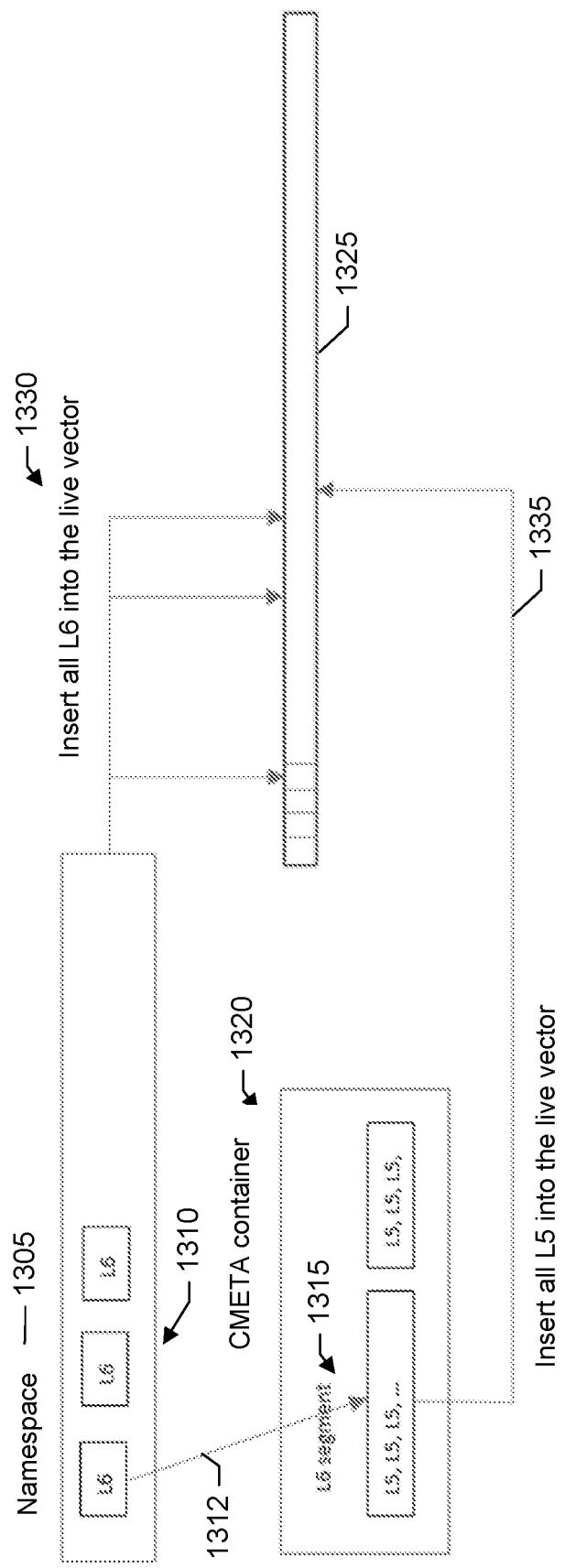
FIG. 13 shows an example of populating the perfect hash vector with live references, according to one or more embodiments.

FIG. 13 shows a block diagram of an example of enumeration in which the PHV is populated with fingerprints of live segments. As shown in the example of FIG. 13, in a namespace 1305, there are a set of L6 segments 1310 referencing 1312 L5 segments 1315. As discussed, the segments are stored in containers 1320, e.g., CMETA containers.

A PHV 1325 has been created based on the fingerprints in the fingerprint index. The enumeration includes iterating all the files in the namespace and inserting 1330 the L6 references into the live vector. Inserting 1335 the L5 references into the live vector, and continuing the process level-by-level for each upper level segments (e.g., L6-L1 segments).

Referring back now to FIG. 10, in a step 1030, the metadata containers are walked by iterating all the fingerprints in the metadata containers and identifying the live and dead fingerprints (or live and dead segments) of each container by checking the perfect hash vector.

More specifically, in a step 1035, a fingerprint stored in a metadata container is selected. In a step 1040, a determination is made as to whether the fingerprint maps to a bit position in the perfect hash vector. In other words, the fingerprint is hashed using the perfect hash function and a determination is made as to whether the hashed fingerprint corresponds to a bit position in the perfect hash vector.

If the (hashed) fingerprint maps to a bit position in the perfect hash vector, the fingerprint or segment of the fingerprint is identified as being live (step 1045). Alternatively, if the (hashed) fingerprint does not map to a bit position in the perfect hash vector, the fingerprint or segment of the fingerprint is identified as being dead (step 1050).

The process continues with walking each of the metadata containers, iterating through all fingerprints in each of the metadata containers, and checking whether a selected (hashed) fingerprint maps to a bit position in the PHV until each metadata container has been examined (step 1055).

Dead segments may be present at a cloud storage for any number of reasons. For example, in some cases it can be more cost-effective to leave dead segments at the cloud storage because the cost of storing the dead segments is less expensive than the I/O operations charged by a cloud provider of the cloud storage to read the segments. As another example, garbage collection algorithms to reclaim space typically do not examine each and every object or unit of data due to time, performance, and cost constraints. In the case of a migration, however, it is desirable to ensure that each unit of data—if live—is migrated so that there is no loss of data. Conversely, it is desirable to not migrate units of data that are dead because such data will consume network bandwidth, occupy space at the destination cloud, and ultimately increase costs.

In a specific embodiment, there is a method for migrating data of a deduplication file system comprising: storing a plurality of containers comprising data and metadata containers, wherein the data containers are stored at a first cloud storage service and comprise segments of files managed by the file system, and wherein the metadata containers are written to a log, identified by a container ID generated sequentially, and comprise references to the data containers; maintaining a fingerprint index to map fingerprints of the segments to container IDs; upon receiving an indication to migrate from the first to a second cloud storage service, creating a checkpoint identifying a container ID at a current head of the log; and during the migration, updating the fingerprint index to map fingerprints of migrated segments to new container IDs, and referencing new data containers comprising the migrated segments, the new data containers having been written to the second cloud storage service; receiving a request to read a file; examining the fingerprint index to identify a container ID associated with a data container storing one or more segments of the file; and based on the identified container ID and the checkpoint, accessing the data container from the first cloud storage service or the second cloud storage service in response to the read request.

The migration of data from the first to second cloud storage service is performed by directly transferring the data from the first to second cloud or, more specifically, without recalling the data back from the first cloud.

In an embodiment, the accessing the data container in response to the read request comprises: comparing the identified container ID with the checkpoint; if the identified container ID is greater than the checkpoint, accessing the data container from the second cloud storage service; and if the identified container ID is less than the checkpoint, accessing the data container from the first cloud storage service.

In an embodiment, the method includes comprising during the migration, identifying segments at the first cloud storage service that are live and segments at the first cloud storage service that are dead, the identification comprising: creating a perfect hash vector from the fingerprint index; enumerating a namespace of the deduplication file system to obtain fingerprints from the namespace, the obtained fingerprints corresponding to live segments at the first cloud storage service; hashing the obtained fingerprints; setting bits in the perfect hash vector corresponding to positions calculated from the hashing; reading the metadata containers to obtain fingerprints stored in the metadata containers; hashing the fingerprints stored in the metadata containers; determining whether a hashed fingerprint from a metadata container maps to a position in the perfect hash vector; if the hashed fingerprint from the metadata container maps to a position in the perfect hash vector, determining that a segment corresponding to the hashed fingerprint from the metadata container is live and should be migrated; and if the hashed fingerprint from the metadata container does not map to a position in the perfect hash vector, determining that the segment corresponding to the hashed fingerprint from the metadata container is dead and should not be migrated.

In an embodiment, the method further comprises during the migration, receiving a request to write data; and writing the data to the second cloud storage service.

In an embodiment, the method further comprises during the migration, ingesting a stream of data comprising first, second, and third segments; deduplicating the first, second, and third segments using the fingerprint index; based on the deduplication, storing the first segment at the second cloud storage service because the fingerprint index indicates that the first segment cannot be found at either the first or second cloud storage services; not storing the second segment because the fingerprint index indicates that the second segment can be found at the first cloud storage service, the second segment not yet having been migrated to the second cloud storage service; and not storing the third segment because the fingerprint index indicates that the third segment can be found at the second cloud storage service.

In an embodiment, the method further comprises during the migration: writing a new data container to the second cloud storage service, the new data container comprising live segments from the first cloud storage service and not comprising dead segments from the first cloud storage service; creating a new metadata container, referencing the new data container, and having a new container ID generated sequentially with respect to the container ID at the current head of the log; and writing the new metadata container to the log, the new metadata container now being at the current head of the log, wherein the log comprises metadata containers referencing data containers at the first cloud storage service, and metadata containers referencing data containers at the second cloud storage service.

In another specific embodiment, there is a system comprising: a processor; and memory configured to store one or more sequences of instructions which, when executed by the processor, cause the processor to carry out the steps of: storing a plurality of containers comprising data and metadata containers, wherein the data containers are stored at a first cloud storage service and comprise segments of files managed by a deduplication file system, and wherein the metadata containers are written to a log, identified by a container ID generated sequentially, and comprise references to the data containers; maintaining a fingerprint index to map fingerprints of the segments to container IDs; upon receiving an indication to migrate from the first to a second cloud storage service, creating a checkpoint identifying a container ID at a current head of the log; and during the migration, updating the fingerprint index to map fingerprints of migrated segments to new container IDs, and referencing new data containers comprising the migrated segments, the new data containers having been written to the second cloud storage service; receiving a request to read a file; examining the fingerprint index to identify a container ID associated with a data container storing one or more segments of the file; and based on the identified container ID and the checkpoint, accessing the data container from the first cloud storage service or the second cloud storage service in response to the read request.

In another specific embodiment, there is a computer program product, comprising a non-transitory computer-readable medium having a computer-readable program code embodied therein, the computer-readable program code adapted to be executed by one or more processors to implement a method comprising: storing a plurality of containers comprising data and metadata containers, wherein the data containers are stored at a first cloud storage service and comprise segments of files managed by a deduplication file system, and wherein the metadata containers are written to a log, identified by a container ID generated sequentially, and comprise references to the data containers; maintaining a fingerprint index to map fingerprints of the segments to container IDs; upon receiving an indication to migrate from the first to a second cloud storage service, creating a checkpoint identifying a container ID at a current head of the log; and during the migration, updating the fingerprint index to map fingerprints of migrated segments to new container IDs, and referencing new data containers comprising the migrated segments, the new data containers having been written to the second cloud storage service; receiving a request to read a file; examining the fingerprint index to identify a container ID associated with a data container storing one or more segments of the file; and based on the identified container ID and the checkpoint, accessing the data container from the first cloud storage service or the second cloud storage service in response to the read request.

In another specific embodiment, there is a method comprising: building a perfect hash vector from a fingerprint index maintained by a deduplication file system, the fingerprint index mapping fingerprints of segments to container IDs of metadata containers referencing data containers in which the segments are stored, the metadata containers being written to a log; walking a namespace of the deduplication file system to obtain fingerprints corresponding to live segments; marking the fingerprints obtained from the walking as being live in the perfect hash vector; walking the log of metadata containers from a tail of the log to a head of the log to cross-reference each fingerprint from each metadata container against the perfect hash vector; if the cross-reference indicates a fingerprint corresponds to a live segment, migrating the segment; if the cross-reference indicates the fingerprint corresponds to a dead segment, not migrating the segment, wherein a segment is live when the segment is referenced by a file according to the namespace.

Figure 14:
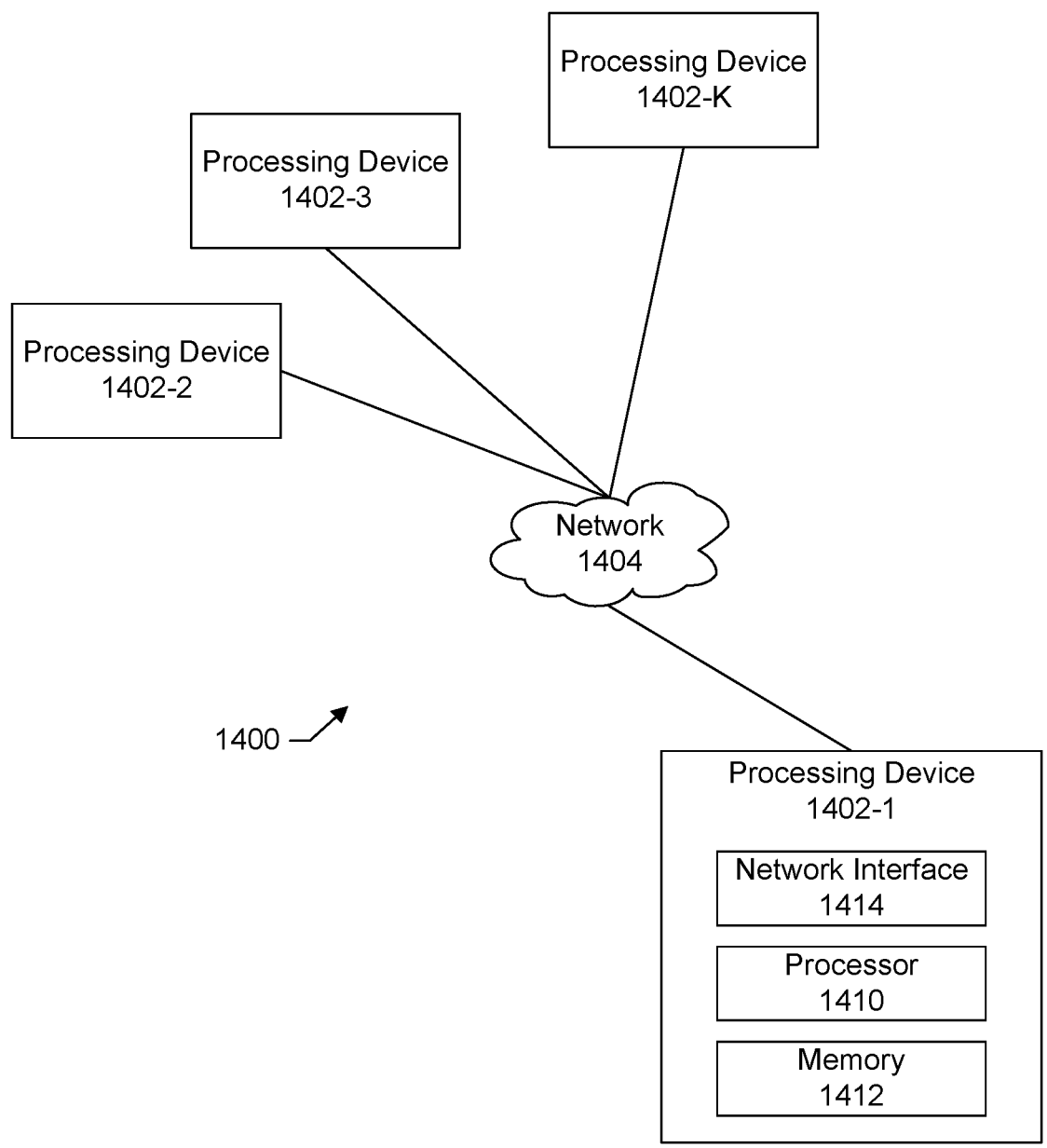
FIG. 14 shows another block diagram of a processing platform that may be utilized to implement at least a portion of an information processing system, according to one or more embodiments.

FIG. 14 shows an example of a processing platform 1400 that may be used with the information processing system shown in FIG. 1

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA) or other type of processing circuitry, as well as portions or combinations of such circuitry elements.

The memory 1412 may comprise random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 15:
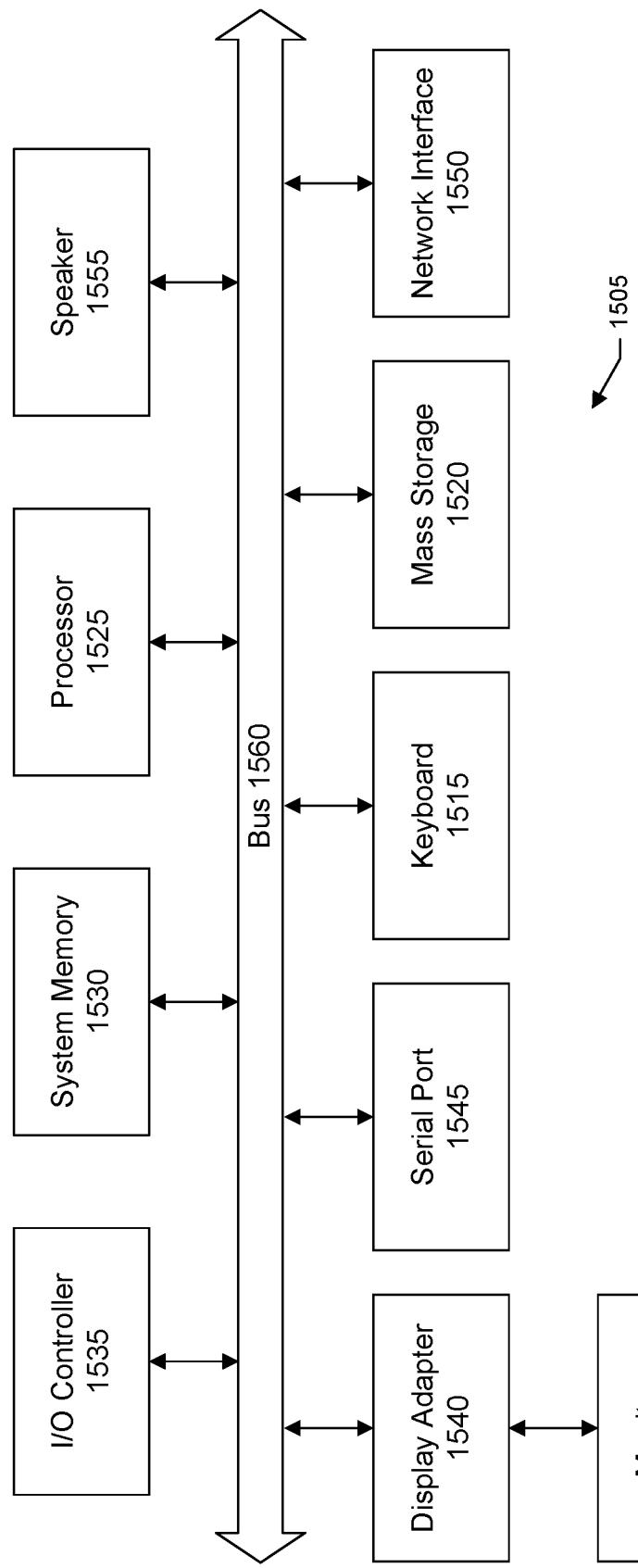
FIG. 15 shows a block diagram of a computer system suitable for use with the system, according to one or more embodiments.

FIG. 15 shows a system block diagram of a computer system 1505 used to execute the software of the present system described herein. The computer system includes a monitor 1507, keyboard 1515, and mass storage devices 1520. Computer system 1505 further includes subsystems such as central processor 1525, system memory 1530, input/output (I/O) controller 1535, display adapter 1540, serial or universal serial bus (USB) port 1545, network interface 1550, and speaker 1555. The system may also be used with computer systems with additional or fewer subsystems. For example, a computer system could include more than one processor 1525 (i.e., a multiprocessor system) or a system may include a cache memory.

Arrows such as 1560 represent the system bus architecture of computer system 1505. However, these arrows are illustrative of any interconnection scheme serving to link the subsystems. For example, speaker 1555 could be connected to the other subsystems through a port or have an internal direct connection to central processor 1525. The processor may include multiple processors or a multicore processor, which may permit parallel processing of information. Computer system 1505 shown in FIG. 15 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for migrating data of a deduplication file system from a source to destination storage tier comprising:
    maintaining an index associating fingerprints of file segments to container numbers of containers within which the file segments are stored;
    at a start of migration, creating a boundary identifying a current container number;
    packing at least a subset of file segments at the source storage tier into a new container to be written to the destination storage tier;
    generating a new container number for the new container;
    updating the index to associate fingerprints of the at least subset of file segments to the new container number;
    receiving a request to read a file segment; and
    querying the index with a fingerprint of the file segment to determine whether the request should be directed to the source or destination storage tier based on a container number of a container within which the file segment is stored.

2. The method of claim 1 wherein container numbers are generated in a sequence, and the method further comprises:
    in response to querying the index, receiving the container number of the container within which the file segment is stored;
    comparing the container number to the boundary; and
    directing the request to the source or destination storage tier based on the sequence, the sequence indicating an ordering of the container number with respect to the boundary.

3. The method of claim 1 wherein the source and destination storage tiers are within a same cloud provider.

4. The method of claim 1 wherein the source and destination storage tiers are provided by different cloud providers.

5. The method of claim 1 further comprising:
    determining whether a file segment at the source storage tier is live or dead;
    migrating live file segments from the source storage tier to the destination storage tier; and
    not migrating dead file segments from the source storage tier to the destination storage tier.

6. The method of claim 1 wherein the deduplication file system is a log-structured deduplication file system in which the containers are maintained in a log and the method further comprises:
    upon creating the boundary, migrating a first range of containers starting with a tail of the log and ending before the boundary;
    writing a second range of containers comprising file segments from the first range of containers to a head of the log; and
    updating the index to indicate that file segments associated with the first range of containers are now associated with the second range of containers.

7. A system for migrating data of a deduplication file system from a source to destination storage tier comprising: a processor; and memory configured to store one or more sequences of instructions which, when executed by the processor, cause the processor to carry out the steps of:
    maintaining an index associating fingerprints of file segments to container numbers of containers within which the file segments are stored;
    at a start of migration, creating a boundary identifying a current container number;
    packing at least a subset of file segments at the source storage tier into a new container to be written to the destination storage tier;
    generating a new container number for the new container;
    updating the index to associate fingerprints of the at least subset of file segments to the new container number;
    receiving a request to read a file segment; and
    querying the index with a fingerprint of the file segment to determine whether the request should be directed to the source or destination storage tier based on a container number of a container within which the file segment is stored.

8. The system of claim 7 wherein container numbers are generated in a sequence, and the processor further carries out the steps of:
   in response to querying the index, receiving the container number of the container within which the file segment is stored;
   comparing the container number to the boundary; and
   directing the request to the source or destination storage tier based on the sequence, the sequence indicating an ordering of the container number with respect to the boundary.

9. The system of claim 7 wherein the source and destination storage tiers are within a same cloud provider.

10. The system of claim 7 wherein the source and destination storage tiers are provided by different cloud providers.

11. The system of claim 7 wherein the processor further carries out the steps of:
   determining whether a file segment at the source storage tier is live or dead;
   migrating live file segments from the source storage tier to the destination storage tier; and
   not migrating dead file segments from the source storage tier to the destination storage tier.

12. The system of claim 7 wherein the deduplication file system is a log-structured deduplication file system in which the containers are maintained in a log and the processor further carries out the steps of:
   upon creating the boundary, migrating a first range of containers starting with a tail of the log and ending before the boundary;
   writing a second range of containers comprising file segments from the first range of containers to a head of the log; and
   updating the index to indicate that file segments associated with the first range of containers are now associated with the second range of containers.

13. A computer program product, comprising a non-transitory computer-readable medium having a computer-readable program code embodied therein, the computer-readable program code adapted to be executed by one or more processors to implement a method for migrating data of a deduplication file system from a source to destination storage tier comprising:
   maintaining an index associating fingerprints of file segments to container numbers of containers within which the file segments are stored;
   at a start of migration, creating a boundary identifying a current container number;
   packing at least a subset of file segments at the source storage tier into a new container to be written to the destination storage tier;
   generating a new container number for the new container;
   updating the index to associate fingerprints of the at least subset of file segments to the new container number;
   receiving a request to read a file segment; and
   querying the index with a fingerprint of the file segment to determine whether the request should be directed to the source or destination storage tier based on a container number of a container within which the file segment is stored.

14. The computer program product of claim 13 wherein container numbers are generated in a sequence, and the method further comprises:
   in response to querying the index, receiving the container number of the container within which the file segment is stored;
   comparing the container number to the boundary; and
   directing the request to the source or destination storage tier based on the sequence, the sequence indicating an ordering of the container number with respect to the boundary.

15. The computer program product of claim 13 wherein the source and destination storage tiers are within a same cloud provider.

16. The computer program product of claim 13 wherein the source and destination storage tiers are provided by different cloud providers.

17. The computer program product of claim 13 further comprising:
   determining whether a file segment at the source storage tier is live or dead;
   migrating live file segments from the source storage tier to the destination storage tier; and
   not migrating dead file segments from the source storage tier to the destination storage tier.

18. The computer program product of claim 13 wherein the deduplication file system is a log-structured deduplication file system in which the containers are maintained in a log and the method further comprises:
   upon creating the boundary, migrating a first range of containers starting with a tail of the log and ending before the boundary;
   writing a second range of containers comprising file segments from the first range of containers to a head of the log; and
   updating the index to indicate that file segments associated with the first range of containers are now associated with the second range of containers.

* * * * *